United States Patent
Fujita

(10) Patent No.: US 6,771,036 B2
(45) Date of Patent: Aug. 3, 2004

(54) POSITION CONTROL METHOD AND POSITION CONTROL SYSTEM FOR DRIVE FEED EQUIPMENT

(75) Inventor: Jun Fujita, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/760,830

(22) Filed: Jan. 17, 2001

(65) Prior Publication Data

US 2001/0008370 A1 Jul. 19, 2001

(30) Foreign Application Priority Data

Jan. 18, 2000 (JP) .................................... P2000-009260

(51) Int. Cl.⁷ ............................ B23Q 5/00; G05B 11/32
(52) U.S. Cl. ...................... 318/625; 318/575; 318/619; 318/80; 318/98
(58) Field of Search .......................... 318/98, 99, 112, 318/66, 68, 69, 70, 71, 619, 625, 632, 575, 74, 77, 79, 80, 85

(56) References Cited

U.S. PATENT DOCUMENTS

| | | | | |
|---|---|---|---|---|
| 3,781,629 A | * | 12/1973 | Yashimoto et al. ......... | 318/632 |
| 3,870,935 A | * | 3/1975 | Abels et al. ................... | 318/52 |
| 4,629,955 A | * | 12/1986 | French et al. ................ | 318/625 |
| 4,808,899 A | * | 2/1989 | Swope ......................... | 318/619 |
| 4,812,725 A | * | 3/1989 | Chitayat ....................... | 318/625 |
| 4,994,978 A | * | 2/1991 | Kawamura et al. .......... | 700/188 |
| 5,025,200 A | * | 6/1991 | Kurakake et al. ............ | 318/569 |
| 5,555,178 A | * | 9/1996 | Hashimoto ................... | 700/175 |
| 5,674,169 A | * | 10/1997 | Yang ............................ | 483/32 |
| 5,903,125 A | * | 5/1999 | Prentice et al. .............. | 318/625 |
| 5,917,300 A | * | 6/1999 | Tanquary et al. ............ | 318/575 |
| 6,034,498 A | * | 3/2000 | Hamamura et al. ......... | 318/632 |
| 6,246,203 B1 | * | 6/2001 | Abbott et al. ................ | 318/649 |

* cited by examiner

Primary Examiner—Bentsu Ro
(74) Attorney, Agent, or Firm—Finnegan, Henderson, Farabow, Garrett & Dunner, L.L.P.

(57) ABSTRACT

When driving a plurality of paralleled feed drive mechanisms individually by servo motors (105, 106), torque of the servo motors (105, 106) is detected, and in dependence on a difference therebetween, a position command of servo motor (106) at a slave side is corrected, so that torque of the slave side servo motor (106) is matched to to torque of servo motor (105) at a master side.

15 Claims, 4 Drawing Sheets

POSITION CONTROL METHOD AND POSITION CONTROL SYSTEM FOR DRIVE FEED EQUIPMENT

BACKGROUND OF THE INVENTION

1. Field of the Invention

The present invention relates to a position control method and a position control system for feed drive equipment, and particularly, to a position control method and a position control system for feed drive equipment provided with a plurality of feed screws for feeding a relatively large movable body.

2. Description of the Related Art

Among feed drive equipment for feeding a relatively large movable body, such as a worktable of a large-scale tooling machine, there are ones of a system in which a plurality of feed screws are disposed in parallel, and the servo motors are driven individually by servo motors. This system allows motors of relatively low capacity to be used.

In feed drive equipment of the above-noted system, a position control is made by distributing an identical position command to a plurality of servo motors, to thereby match rotational positions of a plurality of feed screws with each other.

Therefore, if actual pitches are different between feed screw mechanisms, their feeds have a difference therebetween, which causes a couple of forces acting on a movable body in a twisting direction, and lowers a positioning accuracy of the movable body. Further, in the use of servo motors relatively low of capacity, they have to bear loads corresponding to the couple of forces in addition to a load corresponding to a feed of the movable body itself, and may be overloaded. The difference in pitch between the feed screw mechanisms depends on a temperature difference therebetween, as well, and cannot be covered up by simply improving their tooling precision.

SUMMARY OF THE INVENTION

In this regard, it is possible to detect respective feeds of the feed screw mechanisms, to thereby make a position control for matching the feeds. However, in that case, there is a need for the position control to be a full-closed system in which the feed screw mechanisms are individually provided with position scales. In general, the scales are troublesome to be cleaned if they are made of glass, or unable to render their precision of position high if they are of magnetic type.

The present invention is made with the above noted points in view. It is an object of the present invention to provide a position control method and a position control system for drive feed equipment by which, even when an actual pitch difference or temperature difference exists between feed screw mechanisms, it is possible by matching the feeds to keep a positioning accuracy of a movable body and prevent overloading the motors, such that this can be achieved in both of a semi-closed system and a full-closed system, and in the case of a full-closed system, it is unnecessary to employ multiple scales.

To achieve the object, according an aspect of the invention, there is provided a position control method for feed drive equipment in which a plurality of feed drive mechanisms disposed in parallel for feeding a movable body are individually driven by servo motors, the position control method comprising: detecting torque of the servo motors, and correcting position commands of the servo motors in dependence on the detected torque so that the servo motors have matching torque.

To achieve the object, according another aspect of the invention, there is provided a position control system for feed drive equipment in which a plurality of feed drive mechanisms disposed in parallel for feeding a movable body are individually driven by servo motors, the position control system comprising: a controller for detecting torque of the servo motors, and correcting position commands of the servo motors in dependence on the detected torque so that the servo motors have matching torque.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
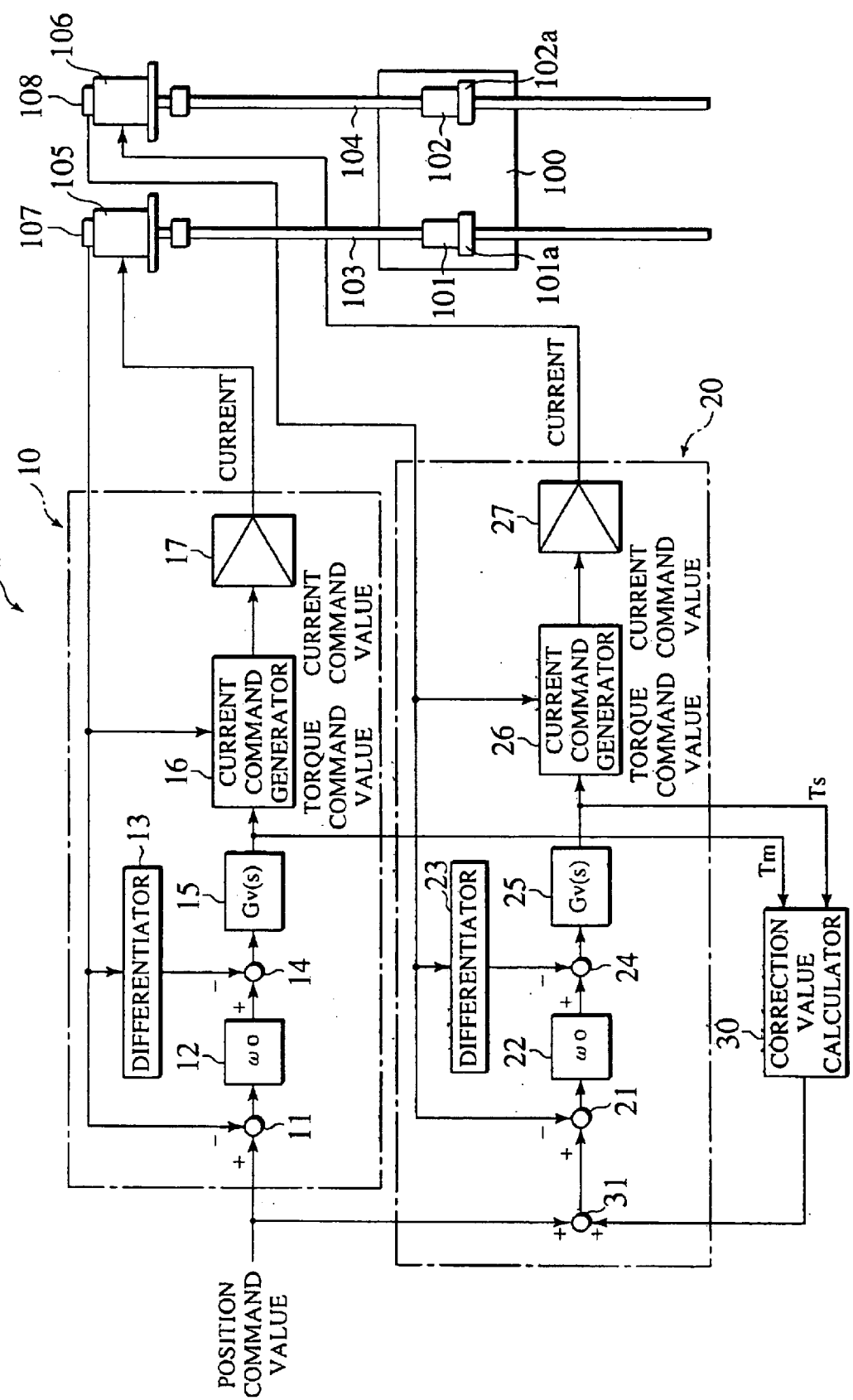
FIG. 1 is a block diagram of a position control system according to a first embodiment of the invention.

There will be detailed below the preferred embodiments of the present invention with reference to the accompanying drawings. Like members are designated by like reference characters.

(First Embodiment)

FIG. 1 shows a position control system 1 for feed drive equipment of a semi-closed loop system according to a first embodiment of the invention. The feed drive equipment to which the position control system 1 is applied has: a first feed nut 101 and a second feed nut 102 that are analogous in structure and fixed in parallel, by mount flanges 101a and 102a, to a movable body 100; and a first ball screw 103 and a second ball screw 104 that are analogous in structure and screwed in the nuts 101 and 102, respectively. The first and second ball screws 103 and 104 are arranged parallel to each other. The first ball screw 103 is driven for rotation by a first-axis servo motor 105, and the second ball screw 104 is driven for rotation by a second-axis servo motor 106.

The first-axis servo motor 105 is provided with a rotary encoder 107 as a motor position detector for detecting a rotational position (motor position) thereof, and the second-axis servo motor 106 is provided with a rotary encoder 108 as a motor position detector for detecting a rotational position (motor position) thereof.

The position control system 1 is constituted with a first-axis controller 10, a second-axis controller 20, and a correction value calculator 30.

The first axis is now supposed as a master axis, and the second axis is supposed as a slave axis.

The first-axis position controller 10 to be for the master axis has a position difference calculator 11, a position controller 12, a differentiator 13, a speed difference calculator 14, a speed controller 15, a current command generator 16, and a servo amplifier 17 for the first-axis servo motor.

The position difference calculator 11 inputs a position command, and calculates a difference between a position command value and a position (as a position feedback signal) of the first-axis servo motor 105 detected by the first-axis rotary encoder 107. The position controller 12 generates a speed command so that the position difference of the first axis becomes a zero. The differentiator 13 differentiates a position signal of the first-axis rotary encoder 107 to generate a speed feedback signal of the first-axis servo motor 105. The speed difference calculator 14 calculates a difference between a speed command value output from the position controller 12 and a motor speed by the speed feedback signal from the differentiator 13. The speed controller 15 generates a torque command so that the speed difference of the first-axis becomes a zero. The current command generator 16 receives the torque command from the speed controller 15 and generates a current command depending on the torque command. The servo amplifier 17 receives the current command from the current command generator 16.

The second-axis position controller 20 to be for the slave axis has a position command corrector 31 at a front stage, and further includes a position difference calculator 21, a position controller 22, a differentiator 23, a speed difference calculator 24, a speed controller 25, a current command generator 26, and a servo amplifier 27 for the second-axis servo motor.

The position command corrector 31 adds a correction value corresponding to motor torque generated by a later-described correction value calculator 30, to a position command value (to be identical in value to the position command value given to the first-axis controller 10). The position difference calculator 21 calculates a difference between a corrected position command value from the position command corrector 30 and a position (as a position feedback signal) of the second-axis servo motor 106 detected by the second-axis rotary encoder 107. The position controller 22 generates a speed command so that the position difference of the second axis becomes a zero. The differentiator 23 differentiates a position signal of the second-axis rotary encoder 108 to generate a speed feedback signal of the second-axis servo motor 106. The speed difference calculator 24 calculates a difference between a speed command value output from the position controller 22 and a motor speed by the speed feedback signal from the differentiator 23. The speed controller 25 generates a torque command so that the speed difference of the second-axis becomes a zero. The current command generator 26 receives the torque command from the speed controller 25 and generates a current command depending on the torque command. The servo amplifier 27 receives the current command from the current command generator 26.

The correction value calculator 30 generates a correction value (corresponding to motor torque) for correcting a position command to be given to the second-axis servo motor 106, so that a difference between torque Tm of the first-axis servo motor 105 and torque Ts of the second-axis servo motor becomes a zero. This correction value is passed through a low-pass filter to remove noise components.

Thus, the correction value calculator 30 and the position command corrector 30 constitute a position command correction means.

According to the present embodiment, at the slave axis side, there is performed a position control by the position command corrected so that the difference between torque Tm of the first-axis servo motor 105 and torque Ts of the second-axis servo motor becomes a zero. Thereby, even if a difference occurs between a pitch error of the feed screw at the first-axis side and a pitch error of the feed screw at the second-axis side or even when a temperature difference develops between the first screw 103 and the second ball screw 104, there is avoided an occurrence of such an undue force that twists the movable body 100, with a result that the positioning accuracy of the movable body 100 is improved. Further, the servo motors 105 and 106 are kept from pushing or repulsing each other between master and slave sides, and overloaded states of the servo motors 105 and 106 are avoidable in advance.

(Second Embodiment)

Figure 2:
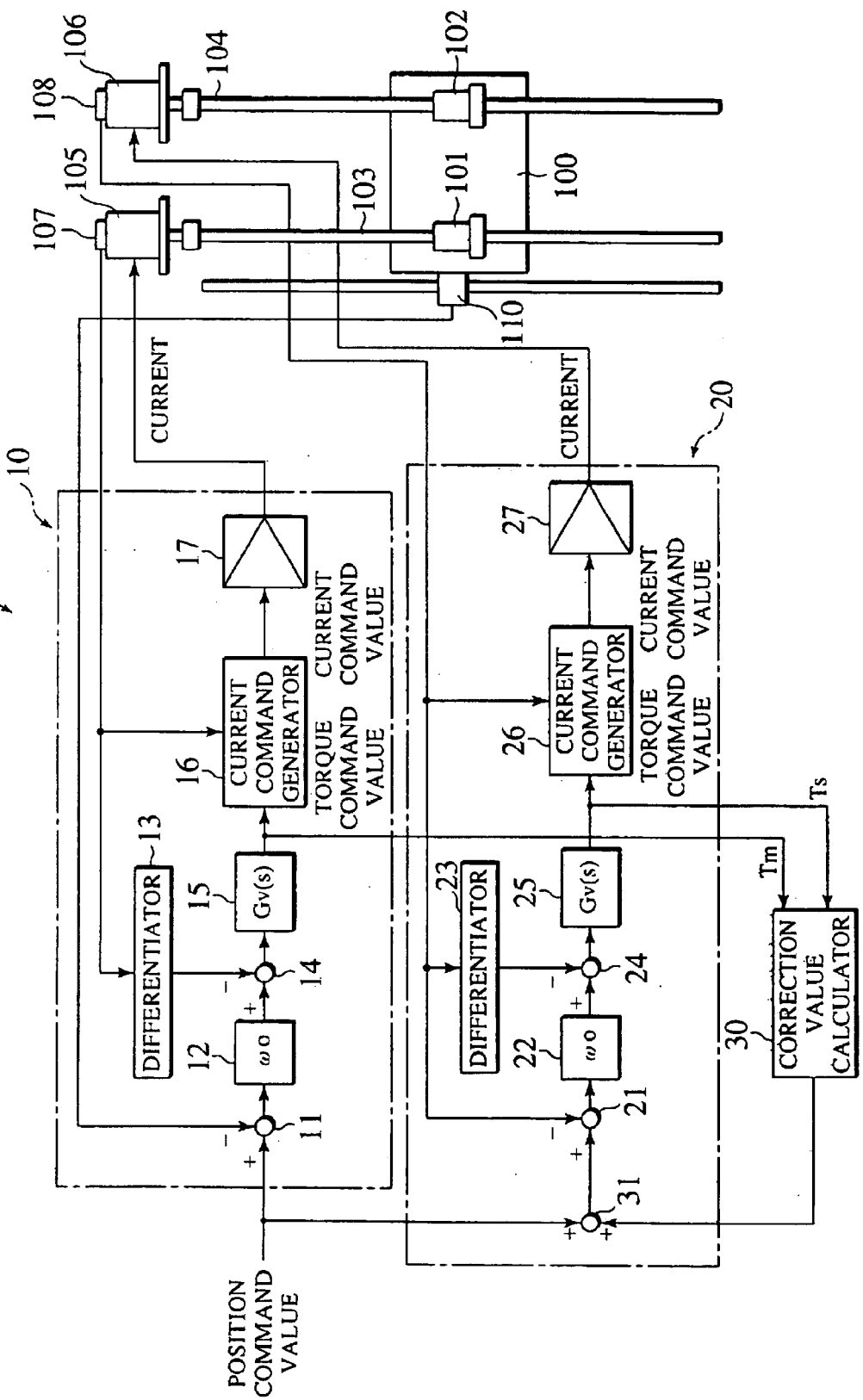
FIG. 2 is a block diagram of a position control system according to a second embodiment of the invention.

FIG. 2 shows a position control system 2 for feed drive equipment according to a second embodiment of the invention. This embodiment is different from the first embodiment in that, at the master-axis side, there is added a linear scale 110 for detecting a real movement position of a movable body 100, and a detection signal thereof is fed back to constitute a full-closed position loop control system. At the slave-axis side, there is constituted a semi-closed position loop like the first embodiment.

(Third Embodiment)

Figure 3:
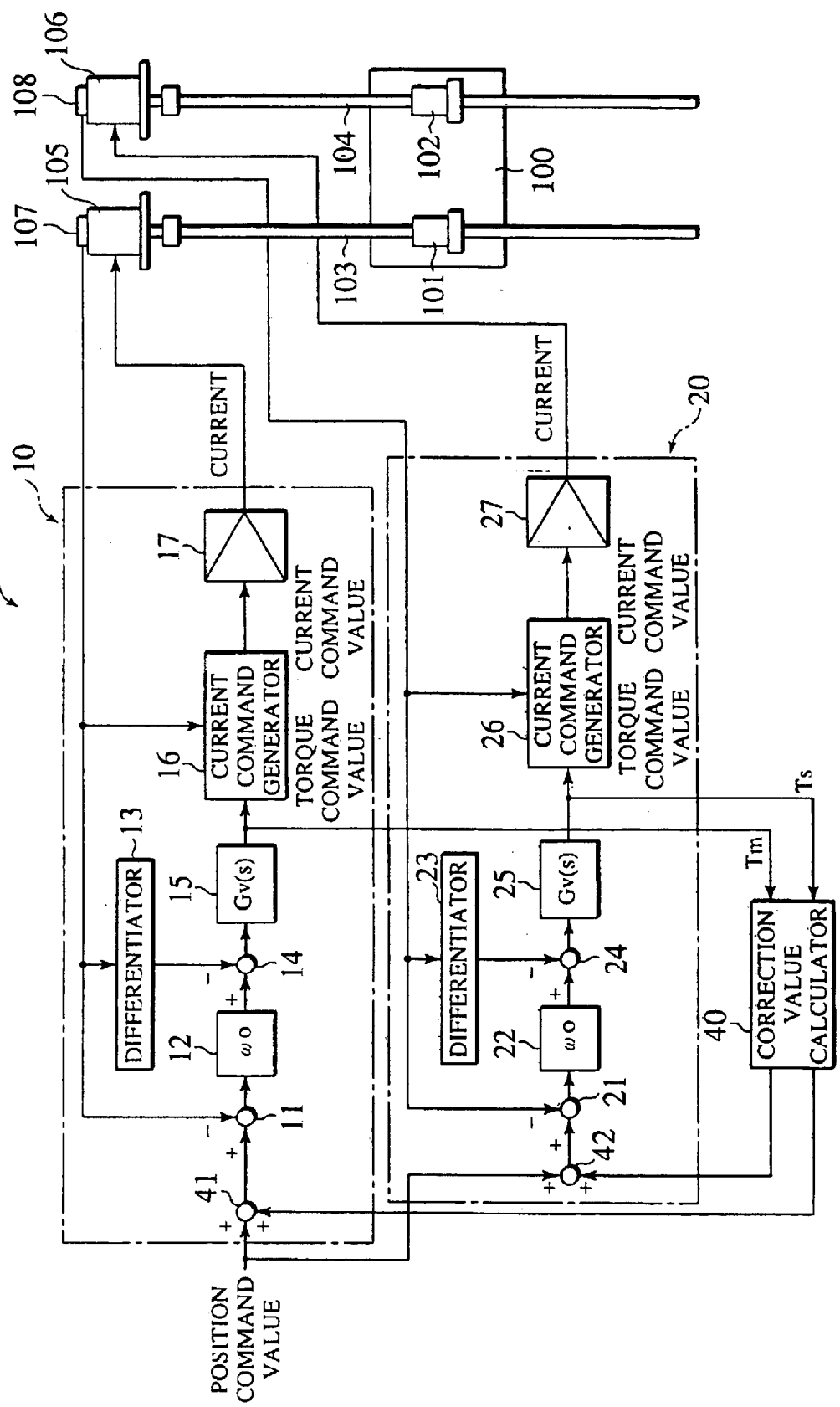
FIG. 3 is a block diagram of a position control system according to a third embodiment of the invention.

FIG. 3 shows a position control system 3 for feed drive equipment of a semi-closed loop system according to a third embodiment of the invention.

In the position control system 3, a correction value calculator 40 detects a command value of a torque command output from a speed controller 15, as torque Tm of a first-axis servo motor 105, and a command value of a torque command output from a speed controller 25, as torque Ts of a second-axis servo motor 106. Then, it calculates an average value of the torque Tm and Ts, and generates a correction value for correcting a position command to be given to the first-axis servo motor 105 and a correction value for correcting a position command to be given to the second-axis servo motor 106, so that torque of the respective axes match with the average value.

A first-axis position controller 10 has at a front stage a position command corrector 41 for adding, to a position command value, the correction value generated by the correction value calculator 40 in correspondence to the motor torque. A second-axis position controller 20 has at a front stage a position command corrector 42 for adding, to a position command value (to be identical in value to the position command value given to the first-axis position controller 10), the correction value generated by the correction value calculator 40 in correspondence to the motor torque.

According to the present embodiment, the position control is performed by a position command corrected so that both torque Tm of the first-axis servo motor 105 and torque Ts of the second-axis servo motor 106 match with average torque. Thereby, even if a difference occurs between a pitch error of the feed screw at the first-axis side and a pitch error of the feed screw at the second-axis side or even when a temperature difference develops between a first screw 103 and a second ball screw 104, there is avoided an occurrence of such an undue force that twists a movable body 100, with a result that the positioning accuracy of the movable body 100 is improved. Further, the servo motors 105 and 106 are kept from pushing or repulsing each other between master and slave sides, and overloaded states of the servo motors 105 and 106 are avoidable in advance.

In this embodiment also, the position control system is not simply limited to a semi-closed loop, but is applicable also to a full-closed loop system in which a position loop is made by a feeding back a signal of a real movement position of a movable body detected by a linear scale or the like, or to a hybrid control system by combination of a full-closed system and a semi-closed system.

According to any of the first to third embodiments of the invention, even when an actual pitch difference or temperature difference exists between feed screw mechanisms, it is possible by matching the feeds to keep a positioning accuracy of a movable body and prevent overloading the motors. Still more, this can be achieved in both of a semi-closed system and a full-closed system. Yet more, in the case of a full-closed system, it is unnecessary to employ multiple scales.

Further, because a command value of a torque command output from a speed controller is detected as torque of the servo motor, there is no need for an extra torque detection means.

Figure 4:
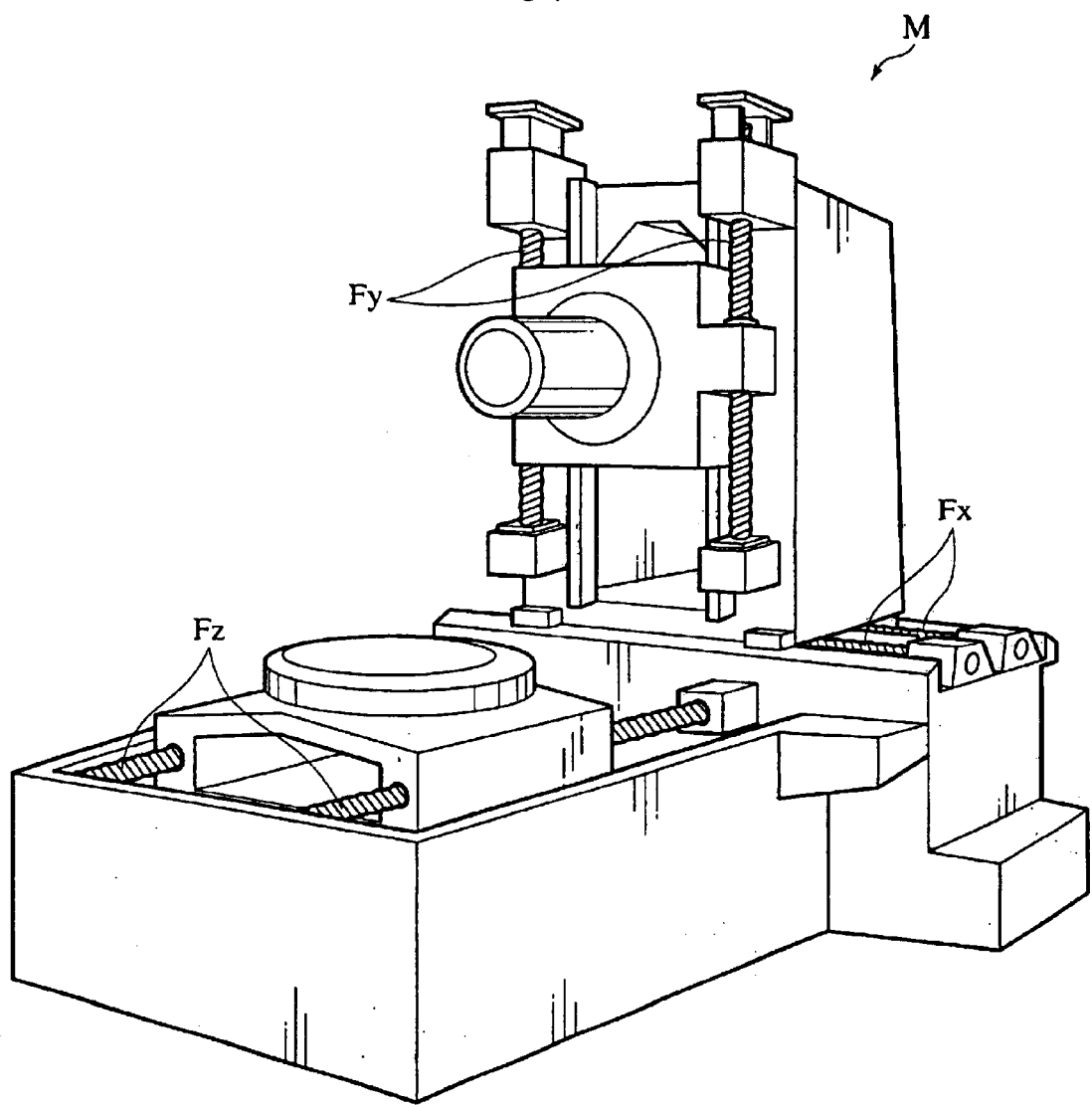
FIG. 4 is a perspective view of a tooling machine equipped with a position control system according an embodiment of the invention.

FIG. 4 is a perspective view of a numerical control tooling machine M in which X-axis, Y-axis, and Z-axis feeds are effected by twin-shaft feed drive equipment Fx, Fy, and Fz each respectively provided with a position control system according to any of the foregoing embodiment.

While preferred embodiments of the present invention have been described using specific terms, such description is for illustrative purposes, and it is to be understood that changes and variations may be made without departing from the spirit or scope of the following claims.

What is claimed is:

1. A position control method for feed drive equipment for a machine tool in which a plurality of screws are disposed in parallel and side-by-side for feeding a movable body associated with the machine tool, the screws being individually driven by servo motors, the position control method comprising:

determining torque of the servo motors as they drive the screws, and correcting position commands of at least one servo motor in dependence on the determined torque so that the servo motors have matching torque.

2. A position control method for feed drive equipment according to claim 1, wherein torque of the servo motors are matched to an average of the determined torque.

3. A position control method for feed drive equipment according to claim 1, wherein torque of one servo motor is matched to the determined torque of another servo motor.

4. A position control method for feed drive equipment according to claim 1, wherein a value of a torque command to be input to a current controller of each servo motor is determined as the torque of the servo motor.

5. A position control system for feed drive equipment for a machine tool in which a plurality of screws are disposed in parallel and side-by-side for feeding a movable body associated with the machine tool, the screws being individually driven by servo motors, the position control system comprising:

a controller operatively associated with the screws through the servo motors and adapted to determine torque of the servo motors, and adapted to correct position commands of at least one servo motor in dependence on the determined torque so that the servo motors have matching torque.

6. A position control system for feed drive equipment according to claim 5, wherein the controller makes torque of the servo motors match to an average of the determined torque.

7. A position control system for feed drive equipment according to claim 5, wherein the controller makes torque of one servo motor match to the determined torque of another servo motor.

8. A position control system for feed drive equipment according to claim 5, wherein the controller determines a value of a torque command to be input to a current controller of each servo motor, as the torque of the servo motor.

9. A position control system for feed drive equipment according to claim 5, further comprising:

a plurality of feed nuts associated with the screws, the moveable body being attached to the feed nuts, wherein the feed nuts apply torque to the servo motors through the screws.

10. A feed drive system for a tooling machine, comprising:

a plurality of feed drive mechanisms disposed in parallel and side-by-side and associated with the tooling machine;

a movable body associated with the feed drive mechanisms, and adapted to be fed along the feed drive mechanisms;

servo motors associated with the feed drive mechanisms, and adapted to individually drive the feed drive mechanisms;

a controller adapted to determine torque of the servo motors, and adapted to correct position commands of at least one servo motor in dependence on the determined torque so that the servo motors have matching torque.

11. A feed drive system according to claim 10, wherein the controller makes torque of the servo motors match to an average of the determined torque.

12. A feed drive system according to claim 10, wherein the controller makes torque of one servo motor match the determined torque of another servo motor.

13. A feed drive system according to claim 10, wherein the controller determines a value of a torque command to be input to a current controller of each servo motor as the torque of the servo motor.

14. A feed drive system according to claim 10, wherein the servo motors include first and second servo motors, and the controller comprises a corrector configured to add a correction value to a position command value configured to control the second servo motor so the difference between torque of the first and second servo motors is zero.

15. A feed drive system according to claim 10, wherein the servo motors include first and second servo motors, the feed drive system further comprising a calculator configured to generate a correction value for correcting a position command to be given to the second servo motor so that a difference between torque of the first servo motor and torque of the second servo motor becomes zero.

* * * * *

UNITED STATES PATENT AND TRADEMARK OFFICE
CERTIFICATE OF CORRECTION

PATENT NO. : 6,771,036 B2
DATED : Auust 3, 2004
INVENTOR(S) : Jun Fujita

It is certified that error appears in the above-identified patent and that said Letters Patent is hereby corrected as shown below:

Title page,
Item [57], ABSTRACT,
Line 6, "matched to to torque" shoud read -- matched to torque --.

Signed and Sealed this

First Day of February, 2005

JON W. DUDAS
*Director of the United States Patent and Trademark Office*